United States Patent [19]

Fischle et al.

[11] Patent Number: 5,524,974
[45] Date of Patent: Jun. 11, 1996

[54] MOTOR VEHICLE WHEEL BRAKING SURFACE TEMPERATURE DETERMINING METHOD

[75] Inventors: Gerhard Fischle, Esslingen; Ralph Klingel, Wimsheim, both of Germany

[73] Assignee: Mercedes-Benz AG, Germany

[21] Appl. No.: 452,996

[22] Filed: May 30, 1995

[30] Foreign Application Priority Data

May 28, 1994 [DE] Germany .................. 44 18 768.8

[51] Int. Cl.⁶ .................................................. B60T 17/22
[52] U.S. Cl. .................. 303/191; 364/557; 364/426.1; 188/1.11
[58] Field of Search .................. 303/191, 113.2, 303/139, 166, 167, 176; 188/1.11 R, 1.11 E; 364/426.01, 426.02, 426.03, 557

[56] References Cited

U.S. PATENT DOCUMENTS 5,136,508  8/1992  Bannon et al. ................. 364/426.01

FOREIGN PATENT DOCUMENTS

0594113A1  10/1993  European Pat. Off. .
3127302A1  1/1983  Germany .
3407716A1  9/1985  Germany .
4020693A1  2/1992  Germany .
4235364A1  4/1994  Germany .
WO91/19632  12/1991  WIPO .

Primary Examiner—Robert J. Oberleitner
Assistant Examiner—Peter M. Poon
Attorney, Agent, or Firm—Evenson, McKeown, Edwards & Lenahan

[57] ABSTRACT

A method provides a continuous indirect termination of the braking-surface temperature for vehicles having a wheel-slip control system using active brake actions, in which the instantaneous temperature value is reduced cyclically up to, at most, a predetermined minimum temperature by a decrement allowing for the cooling and, if brake activation is recognized, is additionally increased by a heating increment. This increment is ascertained solely by recording the wheel speeds or from data of a possibly present brake-valve control, for example a wheel-slip control system, and from filed characteristic diagrams obtained empirically. This provides a reliable estimation of brake temperature at a minimum outlay in terms of sensors.

14 Claims, 1 Drawing Sheet

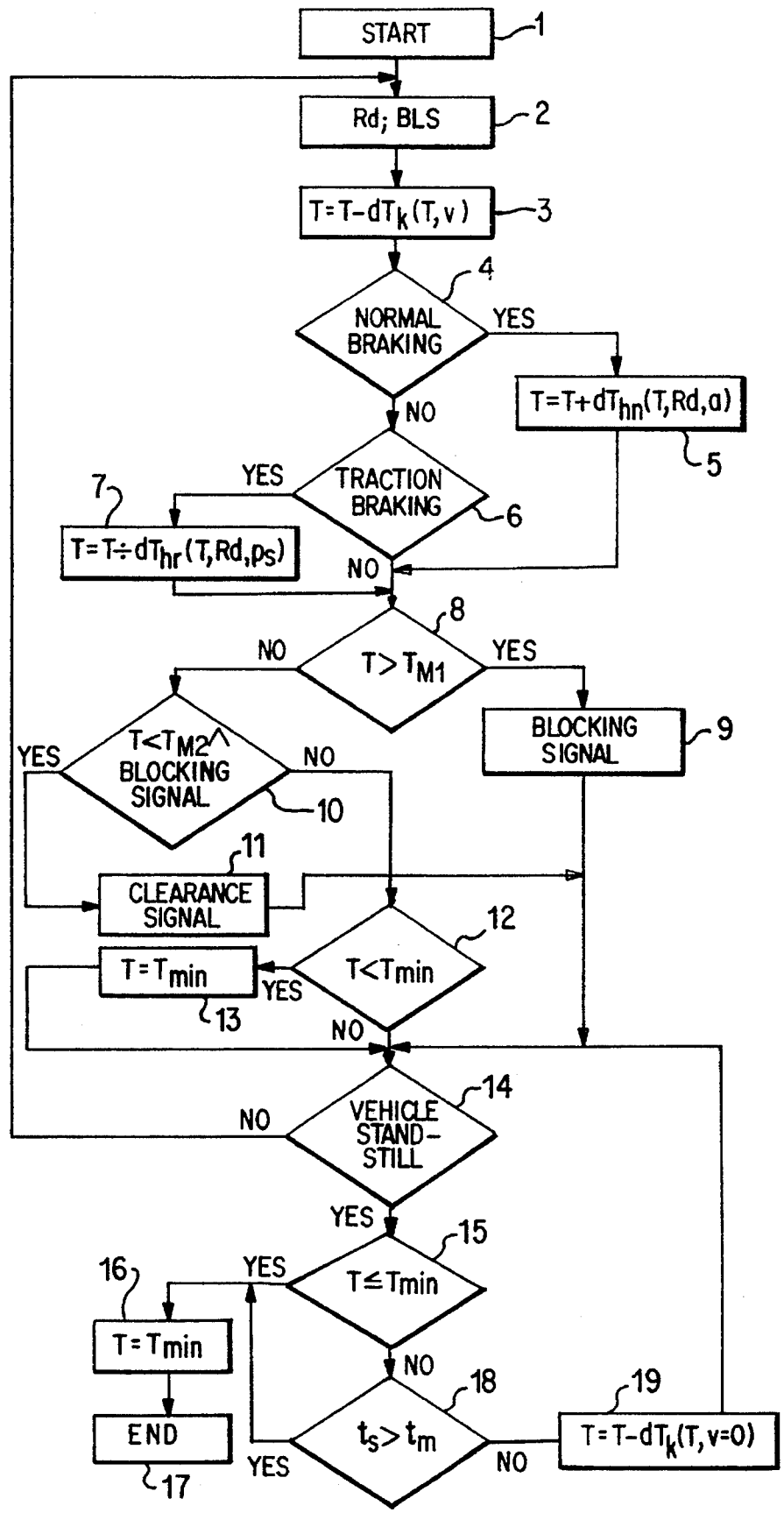

MOTOR VEHICLE WHEEL BRAKING SURFACE TEMPERATURE DETERMINING METHOD

BACKGROUND AND SUMMARY OF THE INVENTION

The present invention relates to a method for determining the braking-surface temperature for one or more wheels of a motor vehicle by continuously redetermining the braking-surface temperature (T) cyclically in the driving mode indirectly from wheel-speed and brake-state data, in each cycle, reducing the instantaneous temperature value (T) by a cooling decrement ($dT_k$) to no more than a predetermined minimum temperature ($T_{min}$), and, with the wheel brake activated during normal braking or braking controlling wheel slip, increasing the instantaneous temperature value (T) by a heating increment ($dT_h$) ascertained in dependence on data from at least one of measured wheel speeds (Rd), from quantities (v, a) derivable therefrom and from slip-controlling wheel-brake valve activations. The term "braking surface" as used herein means both a brake lining and a brake disc.

Particularly in modern systems of driving dynamics which, in order to obtain driving stability or to increase traction, make use of a drive-slip control system, by way of which brake pressure can actively be built up in one or more driving wheels, information must be available on the braking-surface temperature. Such information is necessary in the case of a high wheel-brake load as a result of long-lasting control actions involving the system of driving dynamics, for example on account of an unfavorable driving mode, to protect the wheel brakes against overloading and to ensure that the normal braking function is maintained.

DE 31 27 302 C2 describes measurement of the braking-surface temperature directly by the use of appropriate sensors. To avoid the need for temperature sensors, Preliminary publication DE 34 07 716 A1 describes deriving the braking-surface temperature for a braking operation, for the purpose of ascertaining the brake wear, from the actuation time of the brake, the wheel speed or the vehicle speed and the brake pressure recorded by a specific sensor.

A further indirect temperature-determining method is described in the German Patent Application P 43 16 993.7 not previously published. In this method, the braking-surface temperature is obtained from a consideration of the energy balance by relevant data ascertained during a braking operation. For the cooling interval following each braking operation, a cooling behavior exponential in time is assumed.

DE 42 35 364 A1 also discloses a method for the indirect determination of the temperature of a disc brake. The temperature value is re-determined cyclically, and is increased during braking operations and reduced during time intervals without braking. The temperature increase during braking is ascertained here by a load signal which represents the load state of the brake and for the determination of which are employed once again, inter alia, a speedometer signal representing the vehicle speed and a brake-pressure signal representing the brake-jaw pressing force. This brake-pressure signal is derived from a pressure sensor to be arranged, for example, on a brake valve.

A known method without brake-pressure sensors Is described in DE-4,020,693 A1. The temperature increase associated with a normal braking operation not controlling wheel-slip is ascertained in dependence on the vehicle speed, on the vehicle deceleration and on vehicle-specific constants. The vehicle speed and, derived therefrom, the vehicle deceleration are ascertained via wheel-speed sensors. In particular, the temperature-increase increment consists of two addends, of which one is proportional to the square of the permanently predetermined low reference speed and the other to the speed change since the last determination of the increase increment. Thus, no speed-dependent road-resistance effect is taken into account, thereby limiting the accuracy of the brake-temperature determination.

An object of the present invention is to provide a method in which the braking-surface temperature can be comparatively reliably estimated continuously without temperature and brake-pressure sensors, specifically also for a driving wheel loadable with brake pressure by a wheel-slip control system.

This object has been achieved by a method in which the heating increment ($dT_{hn}$) for normal braking operations is fixed proportionally to a braking-induced vehicle-deceleration value (a) obtained as the difference between deceleration value ascertained from the wheel speeds and a deceleration value taken from a stored road-resistance characteristic diagram taking into account at least one of engine drag moment, the air resistance and rolling resistance of the vehicle, and proportionally to measured speed (Rd) of the wheel.

The only sensor required for practicing the method of the present invention is essentially that for recording wheel speeds which is in any case usually present in currently produced vehicles. The method involves cyclic temperature re-determinations. The brake cooling is taken into account from cycle to cycle by subtraction of a respective cooling decrement. This arithmetic decrementing is discontinued when the temperature thus ascertained falls below a predetermined minimum value which is expediently of the order of magnitude of the ambient temperature, so that no unrealistically low temperature values are obtained.

In the temperature-determining cycles occurring within brake-activation phases, a heating increment is to be added to the instantaneous temperature value and is derived from the vehicle deceleration obtained via the recorded wheel speeds and/or from control information for the brake valves of the wheel for braking operations in response to wheel-slip control operations. In this way, the braking-surface temperature of one or more wheels, particularly also of driving wheels loadable actively with brake pressure via a wheel-slip control system, can be reliably estimated at any moment at a minimum outlay in terms of sensors, data in any case present on the vehicle being for the most part utilized.

For the normal braking phases, provision is made for correcting the ascertained vehicle-deceleration value by a deceleration value which is governed by the road resistance, in particular by the engine drag moment, but also by the air resistance and rolling resistance of the vehicle. This deceleration value induced by road resistance can, for example, be determined empirically and be stored retrievably in the vehicle in the form of corresponding characteristic diagrams. The heating increment is then selected, for the normal braking operations, proportionally to the corrected vehicle-deceleration value and proportionally to the speed of the respective wheel.

According to a further aspect of the present invention, the cooling increment is selected not only in dependence on temperature, but also in dependence on vehicle speed. This makes possible an allowance for the fact that the cooling rate rises with an increase in vehicle speed and therefore also an increase in wheel speed.

For a wheel which is loadable actively with brake pressure by a wheel-slip control system, an advantageous feature of the present invention makes use, for slip-controlling braking operations, of the control information for the brake valves involved which is provided for this purpose. Thereby, it is possible to determine in a highly reliable way the built-up brake pressure which is itself a measure of the increase in the braking-surface temperature. In this case, during braking phases controlling wheel slip, the heating increment is selected proportionally to the brake pressure ascertained from the valve-activation data.

It is also advantageous to select the proportionality constant for one or both types of heating increments in dependence on temperature, specifically falling with a decreasing temperature, in order to allow for the fact that, at higher braking-surface temperatures, the temperature rise may no longer take place linearly with the temperature.

The present invention makes particular advantageous use of the temperature-determining method for controlling the activatability of an existing wheel-slip control system. For this purpose, when a corresponding limit value is exceeded by the braking-surface temperature, blocking information is generated. In such a highly heated brake, the method prevents the wheel-slip control from additionally loading the highly heated brake with brake pressure. This avoids excessive overheating of the braking surface, so that the braking surface can always still be kept operational for normal braking. Only when the braking-surface temperature has fallen again below a second limit value which is no higher than the first is the wheel-slip control cleared again. So as not to have to discontinue a renewed attempt at control after a short time because the threshold is exceeded, but instead to guarantee a sufficiently long cooling phase until the blocking information is cancelled again, or in order to keep effects of control oscillations low, the second limit value is preferably selected lower by a particular amount than the first limit value.

As a result of the foregoing, the preservation of the information on the braking-surface temperature is maintained even when the vehicle is parked, until the estimated temperature has reached a normal environment-related value which realistically corresponds to the actual brake-surface temperature after a sufficient period of standstill of the vehicle. After the vehicle has been at a standstill and is started up again shortly thereafter, the assumption of a value for the braking-surface temperature which corresponds essentially to the ambient temperature is prevented, where the braking surface has, in reality, not yet cooled to this temperature again.

BRIEF DESCRIPTION OF THE DRAWINGS

These and other objects, features and advantages of the present invention will become more readily apparent from the following detailed description when taken in conjunction with the accompanying sole figure which shows a program flowchart of a method for indirect braking-surface temperature determination in accordance with the present invention.

DETAILED DESCRIPTION OF THE DRAWINGS

The main purpose of the instance of use described here and involving a monitoring of the braking-surface temperature is to protect the brakes of the driving wheels of a motor vehicle against excessive heating, such as could otherwise occur particularly as a result of an existing electronic traction system. This electronic traction system uses modified ABS hydraulics for controlling the wheel slip by loading with brake pressure, so that, by a one-sided braking of the low wheel, that is to say that wheel with the lower adhesion, it is possible to achieve an increase in traction which is similar to that which can be generated by an automatic locking differential.

Because such hydraulics can actively build up brake pressure within specific limits only, it may no longer be possible, in the case of a high-powered vehicle when there is maximum engine torque, to brake this engine torque completely, so that the low wheel can possibly no longer be kept within the desired slip range. This signifies, at the same time, a considerable temperature generation on the braking surface as a result of the corresponding control brake pressure, both as to traction systems and to stability actions of the wheel-slip control system.

A further cause of a pronounced heating of the braking surface is a maximum acceleration to μ-split, particularly at an increasing vehicle speed, brought about by the brake pressure required for an increase of traction in conjunction with the current high wheel speed. A similar heating results from frequent starting operations to μ-split on a gradient, particularly with a loaded vehicle.

With reference now to the flow diagram, the functioning of the associated method for braking-surface temperature determination for a driving wheel of the motor vehicle with the electronic traction system as a system controlling wheel slip is described below, the only sensors required for this purpose are a wheel-speed sensor for each wheel and the stop-light switch for recognizing normal driver-induced braking. The method flow described below is executed continuously and cyclically, for example with a cycle time of 60 ms. The braking-surface temperature of the two driving wheels is monitored, and for a low computing-time requirement, the temperature for each wheel is redetermined alternately per cycle. Alternatively, the temperatures of the two wheels can be recalculated in the same cycle. Moreover, further wheel brakes can, if required, easily be monitored for temperature in the same way, for example by a specifically assigned process flow or else simply from the values of the already monitored wheels by utilizing a known brake-force distribution. The method can be used for vehicles with rear-wheel, front-wheel or all-wheel drive.

The method of the present invention is executed continuously on the driving wheels over the entire vehicle-speed range by the control system suitable for this purpose. This control system guarantees that control actions of the electronic traction system are cut off automatically before an excessive heating of the braking surfaces occurs. Moreover, such wheel-slip control actions of the traction system are prevented when the brake has become greatly heated as the result of frequent vehicle decelerations, for example when driving over a pass or on a motorway trip with major braking involved, so that the full operating capacity of the brake is maintained. The method works individually from each wheel and, at too high a brake temperature, prohibits a control action on the respective wheel and control actions necessitating a braking effect on both sides, for example for stability control.

After a starting step 1, for example initiated by switching on the ignition, in next step 2 the necessary input quantities are recorded. In particular the wheel speeds (Rd) of all four wheels are measured and the position of the stop-light switch (BLS) is interrogated. From the measured wheel speeds (Rd) subjected to filtering, the instantaneous vehicle speed (v) is derived in a conventional manner, for example as the average value of the wheel circumferential speeds of two non-driven wheels.

By utilizing the ascertained vehicle-speed value (v) and the instantaneously applicable braking-surface temperature (T), which corresponds to a previously ascertained value or to an initial value of the order of magnitude of a typical ambient temperature, a cooling decrement ($dT_k$) which is dependent on temperature and vehicle speed is then ascertained by an empirically determined characteristic diagram filed in a memory of the control system. This cooling decrement represents the cooling rate of the braking surface under the instantaneous conditions for the duration of a cycle. The cooling decrement ($dT_k$) is then subtracted from the hitherto applicable lining temperature (T) (step 3).

Next, in step 4, by reference to the position of the stop-light switch (BLS) an interrogation takes place as to whether a normal vehicle-decelerating braking operation is taking place. If this is so, the braking-surface heating occurring thereby during the cycle time is taken into account in the form of a heating increment ($dT_{hn}$) which is added in step 5 to the previous temperature value (T) already reduced by the cooling decrement ($dT_k$). For this purpose, this heating increment ($dT_{hn}$) is determined as follows.

First, a vehicle-deceleration value is ascertained by time derivation of the vehicle speed (v) calculated from the measured wheel speeds (Rd). Part of this vehicle deceleration is caused by the road resistance, particularly by the engine drag moment, air resistance of the vehicle and tire rolling resistance. By way of an already filed or stored characteristic diagram, once again determined empirically, the deceleration component attributable to this road-resistance influence is ascertained and is subtracted from the deceleration obtained from the wheel speeds (Rd), thus yielding the brake-induced deceleration value (a). The individual road-resistance components were previously determined empirically in dependence on the vehicle speed, so that they can be filed as corresponding characteristic diagrams in the control-system memory.

Because the deceleration energy converted into thermal energy is proportional to the product of the speed and deceleration, during normal braking operations the heating increment ($dT_{hn}$) is selected proportionally to the brake-induced deceleration component (a) and to the wheel speed (Rd) of the temperature-monitored wheel. The associated proportionality constant is likewise determined empirically. This can be selected independently of temperature. At a somewhat higher outlay, however, an additional increase in accuracy can be achieved if this constant is predetermined in dependence on temperature, in particular, in a higher temperature range, falling with higher braking-surface temperature, thereby allowing for the fact that the temperature rise in the higher temperature range is no longer strictly linear. Of course, the addition of the normal-braking heating increment ($dT_{hn}$) is carried out only when, during the calculation of the brake-induced deceleration value (a), a value higher than zero is obtained and the vehicle deceleration obtained from the wheel speeds is consequently attributable not only to the road resistance.

In contrast, if the stop-light switch interrogation step 4 has indicated that no vehicle-decelerating braking is taking place, in a next interrogation step 6 a check is made as to whether a brake action of the electronic traction system is taking place for the purpose of wheel-slip control. If this is so (yes), in a next step 7, a relevant heating increment ($dT_{hr}$) is added to the braking-surface temperature (T) reduced by the cooling decrement ($dT_k$), in order to take into account the brake heating caused thereby in the course of a cycle duration. The effect of a brake action of this type is known in full to the control system, because the control system itself determines the valve-opening times for the brake valves involved. A highly accurate estimation of the prevailing brake pressure ($p_s$) can consequently be carried out with the aid of these valve-opening times. This is utilized for determining the heating increment ($dT_{hr}$) for the slip-controlling brake action. That is, this increment ($dT_{hr}$) is selected proportionally to the control brake pressure ($p_s$) thus ascertained and proportionally to the recorded speed (Rd) of the temperature-monitored wheel. In this case too, the proportionality constant is once again determined empirically and, if required, for a further increase in accuracy, is filed as a characteristic curve in dependence on the instantaneous braking-surface temperature (T).

In all three possible cases, i.e. after an incremental temperature increase as a result of normal braking or as a result of a slip-controlling brake action or after detection of the inactivity of the wheel brake, the method is subsequently continued with an interrogation step 8 which detects whether the re-determined braking-surface temperature (T) is higher than a predetermined first limit value ($T_{M1}$). If this is so (yes), a blocking signal is generated next (step 9) and is fed to the electronic traction system, causing a possibly active slip-controlling brake action to be interrupted or else a new such traction-controlling or stability-controlling brake action to cease for the time being. As already stated above, this measure is based on the intention of avoiding excessive brake heating as a result of slip-controlling brake actions and of keeping the brake fully operational for normal braking operations. Accordingly, this temperature limit value ($T_{M1}$) is suitably selected in relation to the particular use, for example of the order of magnitude of 350° C. Normal braking operations are therefore not obstructed by this signal.

In contrast, if the re-determined braking-surface temperature (T) is below this first limit value ($T_{M1}$), in a next interrogation step 10 a check is made as to whether the temperature (T) is below a second limit value ($T_{M2}$) which is lower than the first limit value ($T_{M1}$), and whether the blocking signal generated in step 9 is still active for traction-controlling or stability-controlling brake actions. If this is so (yes), a clearance signal is thereafter generated in step 11, involving the cancellation of the blocking signal of step 9 and indicating to the electronic traction system that slip-controlling brake actions are now possible again. So that the brake is given time to cool and consequently some latitude for subsequent brake actions of this type becomes possible, the second limit value ($T_{M2}$) is selected markedly lower than the first limit value ($T_{M1}$), for example of the order of magnitude of 250° C., if, as specified above, the first limit value ($T_{M1}$) is approximately 350° C. Moreover, this prevents an undesirably harsh control-oscillation behavior.

When the two preceding interrogation steps 8 and 10 have both been answered in the negative, there follows a further interrogation step 12 which checks whether the redetermined braking-surface temperature (T) has fallen below a predetermined minimum value ($T_{min}$) corresponding to a typical ambient-temperature value. If this is so, the braking-surface temperature (T) is set to this minimum value ($T_{min}$) (step 13). This measure ensures that, in the absence of brake actions over a relatively long period of time, the calculated temperature value (T) does not assume an implausibly low value as a result of the cooling decrementing, but remains at a plausible ambient-temperature value.

In all possible instances of the last three temperature-value interrogation steps 8, 10 and 12, steps 9, 11, 12 or 13 are followed by an interrogation step 14 which detects whether the vehicle is at a standstill, by which it is to be understood that the ignition is switched off. This interrogation step 14 concludes a normal temperature-determining cycle during the driving mode. Therefore, when the vehicle is recognized as still running, there is a return to before step 2 for recording the wheel speeds, after which a new program run takes place in a clocked manner. The normal temperature-determining cycle clearly gives a highly reliable estimation of the braking-surface temperature of the monitored wheel by the decrementing of a hitherto applicable temperature value (T) by a factor ($dT_k$) allowing for the lining cooling and by the incrementing of this temperature (T) by a factor ($dT_{hn}$, $dT_{hr}$) which allows for heating as a result of a normal braking operation or of a slip-controlling brake action. The temperature re-determination parallel or alternating in relation to the wheels provides at all times comparatively reliable information on the braking-surface temperature of the driven and, if required, also of the non-driven wheels, without specific temperature or brake-pressure sensors being necessary for this purpose on the wheels. This information is used to deactivate the electronic traction system in the event of too high a braking-surface temperature, in order thereby to avoid brake overheating and to keep the brakes fully operational for normal braking operations.

If interrogation step 14 detects that the vehicle standstill has been reached, an additional follow-up phase within the method for braking-surface temperature determination is executed as follows. First of all, a subsequent step 15 interrogates whether the braking-surface temperature (T) has reached a value lower than or equal to the predetermined minimum value ($T_{min}$). If a plurality of wheel-brake temperatures are monitored, as in the present case, it is expedient to use for the interrogation step 15 the highest of all the instantaneous braking-surface temperatures ascertained, in order to ensure that the associated control unit is cut off before the maximum duration only when all the brake temperatures have reached their minimum value.

If the interrogation in step 15 is positive (yes), this is interpreted as brakes already cooled to ambient temperature, so that, in the next step 16, the braking-surface temperature (T) is set to the minimum value and the method is subsequently terminated (step 17). Only thereafter is the associated control unit cut off.

In contrast, if step 15 recognizes that the calculated braking-surface temperature (T) is still above the minimum value ($T_{min}$), this is to be interpreted to the effect that the vehicle is stationary with brakes which are still hot. If the control unit for braking-surface temperature determination were cut off when the vehicle was stopped, a restarting of the vehicle taking place shortly thereafter would consequently mean that the arithmetic temperature determination commences from an incorrect initial value, for example the predetermined minimum value ($T_{min}$), an ambient-temperature value recorded via an outside-temperature sensor or a value last ascertained in the running driving mode. This is prevented in that the temperature-determining control unit is not yet cut off when the vehicle comes to a standstill, but continues to remain "live". Subsequent to a negative answer to the interrogation step 15, a check is first made, in a further interrogation step 18, as to whether the vehicle standstill duration ($t_s$) has exceeded a predetermined maximum duration ($t_m$). This check serves for limiting the time of the follow-up phase, for example to a maximum duration of approximately 30 min, in order to prevent a current flow through the control unit which lasts too long, for example as a result of a faulty method flow, so that, if the relevant interrogation in step 18 is answered in the affirmative, a jump is made to step 16, whereupon the temperature is set to the minimum value ($T_{min}$) and thereafter there is a continuation to the end of the method (step 17), in conjunction with the cut-off of the control unit.

In contrast, if this maximum duration ($t_m$) has not yet elapsed, the cooling decrementing is continued in step 19 during the vehicle standstill, and the cooling decrement ($dT_k$), which is obtained for the vehicle-speed value zero, is subtracted from the previous temperature value (T). After a decrementing of this kind, there is a return once again to interrogation step 14, in order to check whether there is still a vehicle standstill. This follow-up stage clearly guarantees that the estimated temperature value for the braking surface is maintained even after a vehicle standstill. Thus, in the event of a restarting of the vehicle with brakes which are still warm or hot, the estimated temperature value still lying above ambient temperature is correctly used as the initial value.

Although the invention has been described and illustrated in detail, it is to be clearly understood that the same is by way of illustration and example, and is not to be taken by way of limitation. For example, further embodiments, alternatives and modifications of the above-described method flow in addition to those already specified are possible within the scope of the invention to the average person skilled in the art. Thus, it is advantageous to provide the driver with various indications of the method flow, such as an indication that the electronic traction system is momentarily deactivated because the brakes are too hot. Of course, the method according to the present invention can beneficially be employed for braking-surface temperature determination also for vehicle systems without an electronic traction system, i.e. for vehicles with a normal ABS and/or ASR system, and also for vehicles without a wheel-slip control system of this type. The spirit and scope of the present invention are, therefore, to be limited only by the terms of the appended claims.

We claim:

1. A method for determining braking-surface temperature for a motor-vehicle wheel, comprising the steps of (a) continuously redetermining the braking-surface temperature cyclically in the driving mode indirectly from wheel-speed and brake-state data;

(b) reducing the instantaneous temperature value by a cooling decrement to no more than a predetermined minimum temperature, and (c) with the wheel brake activated during one of normal braking and braking controlling wheel slip, increasing the instantaneous temperature value by a heating increment ascertained in dependence on data from at least one of measured wheel speeds, from quantities derivable therefrom and from slip-controlling wheel-brake valve activations, wherein the heating increment for normal braking operations is fixed proportionally to a braking-induced vehicle-deceleration value obtained as the difference between deceleration value ascertained from the wheel speeds and a deceleration value taken from a stored road-resistance characteristic diagram taking into account at least one of engine drag moment, the air resistance and rolling resistance of the vehicle, and proportionally to measured speed of the wheel.

2. The method according to claim 1, wherein the cooling decrement is fixed according to stored characteristic diagram data in dependence on the instantaneous vehicle speed derived from the measured wheel speeds and on the instantaneous temperature value.

3. The method according to claim 1, wherein controlling of the wheel slip occurs by brake activation via a wheel-slip control system, and fixing proportionally a heating increment for braking operations controlling wheel slip to wheel-brake pressure calculated from valve-opening times and to the measured wheel speed.

4. The method according to claim 3, wherein the cooling decrement is fixed according to stored characteristic diagram data in dependence on the instantaneous vehicle speed derived from the measured wheel speeds and on the instantaneous temperature value.

5. The method according to claim 3, wherein a step of blocking information for the wheel-slip control system is generated when the ascertained braking-surface temperature exceeds a predetermined first limit value, and clearance information for the wheel-slip control system is generated when the braking-surface temperature, after previously exceeding the first limit value, falls below a predetermined second limit value which is no greater than the first limit value.

6. The method according to claim 1, wherein a proportionality constant for the heating increment is selected in dependence on the instantaneous braking-surface temperature with reference to a stored characteristic diagram, the proportionality constant falling with decreasing temperature.

7. The method according to claim 6, wherein the cooling decrement is fixed according to stored characteristic diagram data in dependence on the instantaneous vehicle speed derived from the measured wheel speeds and on the instantaneous temperature value.

8. The method according to claim 7, wherein the step of controlling slip of the wheel occurs by brake activation via a wheel-slip control system, and fixing proportionally a heating increment for braking operations controlling wheel slip to wheel-brake pressure calculated from valve-opening times and to the measured wheel speed.

9. The method according to claim 6, wherein a step of blocking information for the wheel-slip control system is generated when the ascertained braking-surface temperature exceeds a predetermined first limit value, and clearance information for the wheel-slip control system is generated when the braking-surface temperature, after previously exceeding the first limit value, falls below a predetermined second limit value which is no greater than the first limit value.

10. The method according to claim 1, wherein the cyclic temperature redetermination is continued by further subtraction of the cooling decrement from a previous temperature value, including after the vehicle has come to a standstill, until the ascertained braking-surface temperature has reached the predetermined minimum value.

11. The method according to claim 10, wherein the cooling decrement is fixed according to stored characteristic diagram data in dependence on the instantaneous vehicle speed derived from the measured wheel speeds and on the instantaneous temperature value.

12. The method according to claim 11, wherein the, step of controlling slip of the wheel occurs by brake activation via a wheel-slip control system, and fixing proportionally a heating increment for braking operations controlling wheel slip to wheel-brake pressure calculated from valve-opening times and to the measured wheel speed.

13. The method according to claim 12, wherein a respective proportionality constant for at least one of the heating increments is selected in dependence on the instantaneous braking-surface temperature with reference to a stored characteristic diagram, the proportionality constant falling with decreasing temperature.

14. The method according to claim 13, wherein a step of blocking information for the wheel-slip control system is generated when the ascertained braking-surface temperature exceeds a predetermined first limit value, and clearance information for the wheel-slip control system is generated when the braking-surface temperature, after previously exceeding the first limit value, falls below a predetermined second limit value which is no greater than the first limit value.

* * * * *